March 24, 1970 A. H. BOBECK ET AL 3,503,055

INPUT SOURCE FOR DOMAIN PROPAGATION DEVICE

Filed April 29, 1968 2 Sheets-Sheet 1

INVENTOR
A. H. BOBECK
BY Herbert M. Shapiro
ATTORNEY

United States Patent Office 3,503,055

Patented Mar. 24, 1970

3,503,055

INPUT SOURCE FOR DOMAIN PROPAGATION DEVICE

Andrew H. Bobeck, Chatham, N.J., assignor to Bell Telephone Laboratories, Incorporated, Murray Hill and Berkeley Heights, N.J., a corporation of New York Filed Apr. 29, 1968, Ser. No. 725,008
Int. Cl. G11b 5/62
U.S. Cl. 340—174 4 Claims

ABSTRACT OF THE DISCLOSURE

A planar input circuit for single wall domains is described. The circuit makes use of the fact that a domain wall encompassing a first single wall domain cannot follow an indentation in a first conductor which generates a field for expanding the domain when pulsed. The wall of the domain protrudes beyond the indentation and a second conductor having a mating indentation may be operated to sever a second single wall domain from the first without overlapping the first conductor.

FIELD OF THE INVENTION

This invention relates to domain propagation devices and more particularly to devices in which single wall domains are moved in a sheet of magnetic material having a preferred direction of magnetization out of the plane of the sheet.

BACKGROUND OF THE INVENTION

Single wall domains are reverse-magnetized domains having thereabout a domain wall which closes on itself. The domain accordingly has a geometry which is independent of the boundary of the sheet in which it is moved thus providing a two-dimensional propagation capability. This capability is to be contrasted with the one-dimension propagation capability of conventional reverse-magnetized domains which have spaced apart leading and trailing walls which do intersect a boundary of the film in which the domains move. Single wall domains and a variety of operations therewith are described in the Bell System Technical Journal (BSTJ), vol. 46, No. 8, October 1967, pages 1901, et seq.

Experimentation has indicated that single wall domains are provided conveniently in a sheet of appropriate material, such as a rare earth orthoferrite, by severing the domain from a source of such domains. Let us adopt the convention that the magnetization of a sheet of orthoferrite has a preferred direction for magnetization normal to the plane of the sheet and that flux directed downward into the sheet is represented by a minus sign while flux directed upward out of the sheet is represented by a plus sign. A single wall domain, in this context, may be represented by an encircled plus sign and the source of such domains may be represented as a wedge-shaped boundary encompassing a plus sign and extending point in from the periphery of the sheet. A hairpin-shaped conductor overlying such a wedge-shaped source severs the tip thereof when a current flows therein of a polarity to drive negative the area between the two legs of the hairpin. The tip, now severed, is free for propagation anywhere in the sheet in response to consecutively offset, localized, attracting field (viz: field gradients) as explained in the above-noted BSTJ article.

When multiple propagation channels are desired in a single magnetic sheet, a corresponding number of sources may be desired also. These sources may be separate from one another or, on the other hand, may comprise extended areas from a single source of domains. It is convenient for the boundary of the source, or sources whichever may be the case, to be coincident with a conductor having an appropriate D.C. current therein. Whenever a tip of an extended region is severed from the source, that D.C. current regrows the source to its original geometry. This arrangement is shown in copending application Ser. No. 579,931, filed Sept. 16, 1966, for A. H. Bobeck, U. F. Gianola, R. C. Sherwood, and W. Shockley.

It is convenient in magnetic circuits and especially in miniaturized magnetic circuits to employ photoresist techniques to deposit drive circuitry onto a magnetic sheet. When photoresist techniques are employed, it is advantageous to avoid overlapping conductors because the latter requires additional insulating steps to space apart the conductors from one another and, as a consequence, from the magnetic sheet. The spacings in turn cause variations in the field generated in the magnetic sheet by currents in those conductors.

BRIEF DESCRIPTION OF THE INVENTION

The invention is based on the realization that a magnetic domain wall cannot exactly align itself with the field patterns produced by a conductor having extreme indentations.

In one specific embodiment a region of first magnetization is confined to a first area of a magnetic sheet by a field generated in response to a current flowing in a conductor encompassing that area. A second conductor encompassing a second area greater than the first area is pulsed to extend the region of first magnetization. But the second conductor has an indentation beyond which the region of first magnetization protrudes when extended. A third conductor with a mating indentation severs the protruding portion of the region of first magnetization, when pulsed, in the absence of overlapping conductor geometries.

DETAILED DESCRIPTION

Figure 1:
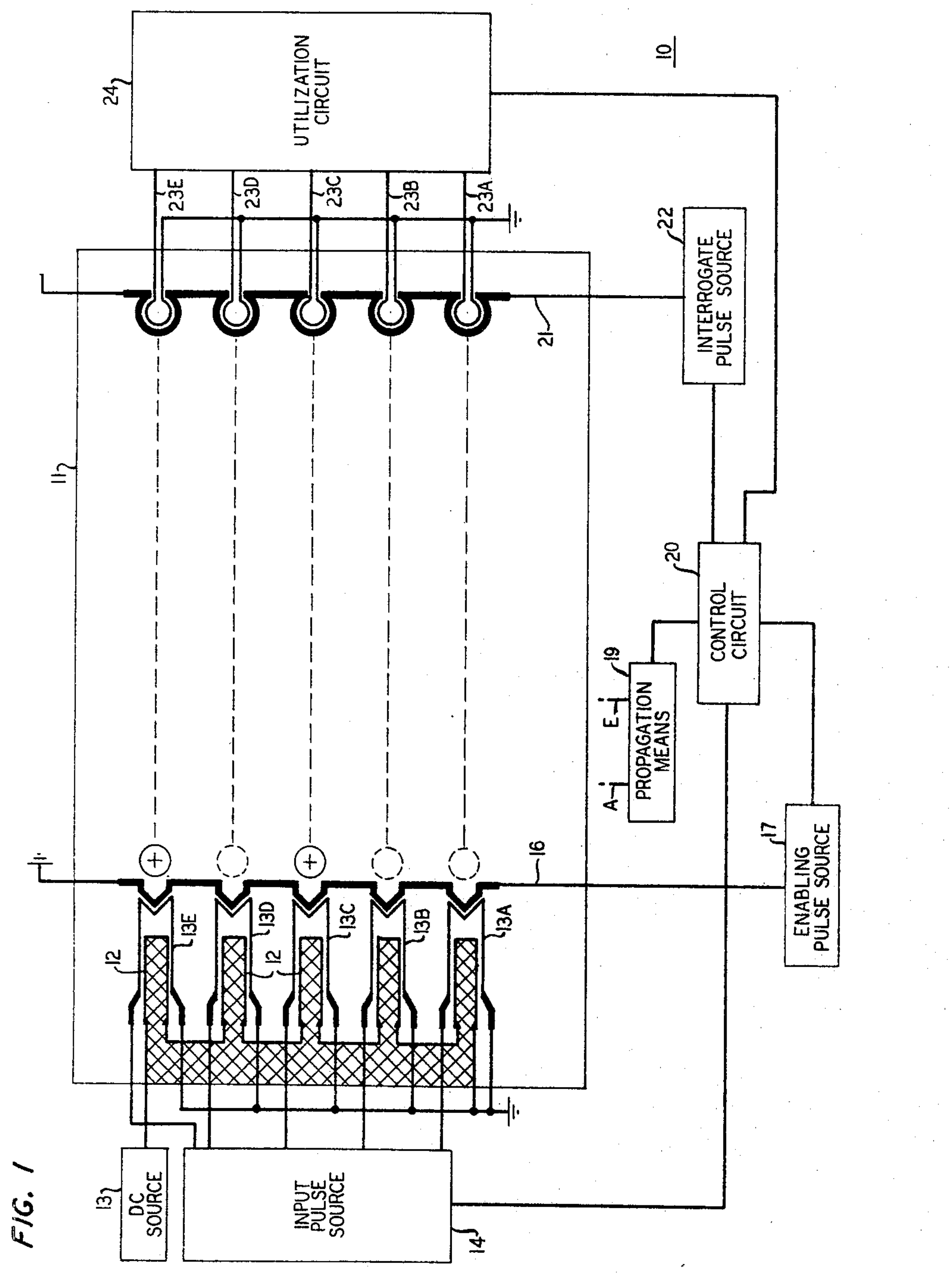
FIG. 1 is a schematic illustration of a domain propagation arrangement in accordance with this invention.

FIG. 1 shows a domain propagation arrangement 10 in accordance with this invention. The arrangement includes a magnetic sheet 11 in which single wall domains can be moved.

A plurality of propagation channels are defined in sheet 11 between input and associated output positions. The input arrangements comprises a conductor 12 defining areas which extend from the leftmost boundary of sheet 11, as viewed, in the direction of the rightmost boundary at which output positions are defined. Conductor 12 is connected between a D.C. source 13 and ground serving to provide a shaped source (viz.: large domain) of positive magnetization from which single wall domains can be severed.

Domains are severed from the source defined by conductor 12 by fields generated by currents applied to conductors 13A through 13E. Each conductor 13 defines an area of sheet 11 greater than but also encompassing an extended area encompassed by a conductor 12. Each conductor 13 is connected between an input pulse source 14 and ground.

Figure 2A:
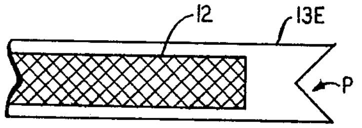
FIGS. 2A, 2B, 3, and 4 are schematic illustrations of a portion of the arrangement of FIG. 1.
Figure 2B:
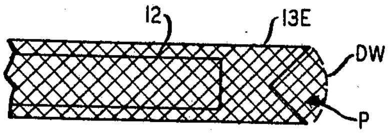

When a conductor 13 is pulsed, the domain confined by conductor 12, as illustrated in FIG. 2A, extends to fill the entire area encompassed by conductor 13. This is illustrated for conductor 13E in FIG. 2B. But conductor 13E has an indented geometry at its extreme position as shown at P in FIGS. 2A and 2B. When the now extended domain fully occupies the area encompassed by conductor 13E, the domain wall DW thereabout cannot conform to the indentation and thus protrudes beyond the indentation into the remaining area of sheet 11.

Figure 3:
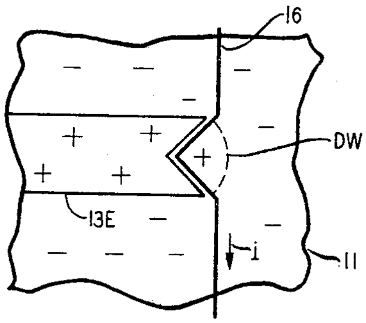
Figure 4:
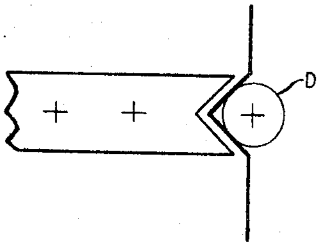

The protruding portion of the domain is severed from the remainder of the domain (source) to form a single wall domain. A conductor 16 including a plurality of indentations therealong is deposited to mate with the indentations in conductors 13. Conductor 16 is connected between an enabling pulse source 17 and ground. When conductor 16 is pulsed in a negative direction as indicated by the arrow *i* in FIG. 3, a negative field is generated between the mating indentations of conductors 13E and 16 thus severing the protruding portion. At the termination of the pulse in conductor 6, a domain D remains to the right of the conductor as viewed in FIG. 4 for propagation and the source contracts to the configuration shown in FIG. 2A.

Figure 5:
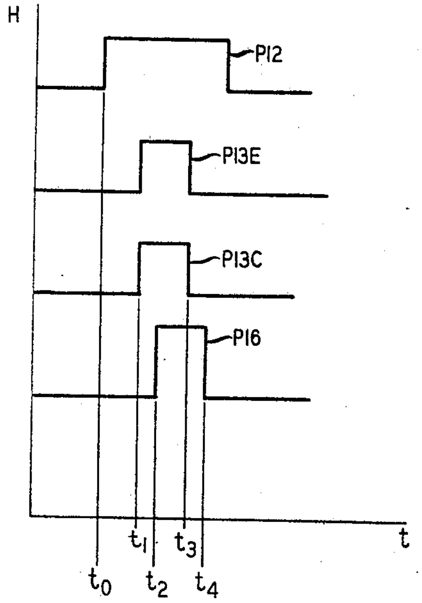
FIG. 5 is a pulse diagram of the operation of that portion of FIG. 1.

The pulse sequence for the provision of the presence and absence of domains representing the binary word 1 0 1 0 0 reading from top to bottom in FIG. 1 is shown in the pulse diagram of FIG. 5. Initially, at time $t_0$, a D.C. pulse P12 is applied to conductor 12. Thereafter, at a time $t_1$ in FIG. 5, pulses are applied selectively to conductors 13E and 13C as represented by the pulseforms P13E and P13C. The source is now extended only in the areas of the two pulse conductors in the manner shown in FIG. 2B. Conductor 16 is next pulsed as shown by pulse P16 at time $t_2$ forming a domain D at the indentation in each of those conductors (13C and 13E) only. Domains are absent at conductors 13A, 13B, and 13D. The presence and absence of a domain in each instance in accordance with the assumed illustrative operation is represented in FIG. 1 as an encircled plus sign ⊕ and as a broken circle ○ respectively. When the pulses on conductors 13 terminate at time $t_3$, the source contracts to its original size shown in FIG. 2A. Pulse P16 terminates thereafter at time $t_4$.

The bits so generated are now ready for propagation in their respective channels to associated output positions. Domains are propagated conveniently by consecutively pulsed loop-shaped conductors which are offset from one another in the desired direction of propagation. This is described in the above-noted BSTJ article. Other techniques for realizing propagation in the absence of such loop-shaped conductors are disclosed, for example, in copending application Ser. No. 710,031, filed March 1, 1968, for A. H. Bobeck and E. Della Torre. An understanding of propagation mechanism and the particular form thereof is not necessary for an understanding of this invention. Accordingly, only a block 19 designated propagation means is shown in FIG. 1 along with broken lines indicating the correspondence between input and output positions for the various channels without further description. Suffice it to say that the propagation means operates in a well understood manner to move domains from input to output positions in the various channels under the control of a control circuit 20 to which it is connected to this end.

A conductor 21 is coupled to output positions in each propagation channel. Conductor 21 is connected between an interrogate pulse source 22 and ground and serves to collapse any domains in output positions when pulsed. Conductors 23A–23E also couple the output positions of corresponding channels. Each of the conductors 23 is connected between a utilization circuit 24 and ground. When conductor 21 is pulsed, any domains, present in output positions, are collapsed by the field generated thereby thus inducing pulses in corresponding conductors 23 for detection by utilization circuit 24. Conductors 23 are conveniently of a figure eight geometry (not shown) for noise cancellation purposes as is well understood, only one loop of the figure eight corresponding to an output position, the other loop encompassing a like interrogated position in which no single wall domains appear.

Sources 14, 17, and 22, and circuits 19 and 24 are connected to control circuit 20 for synchronization purposes. The various sources and circuits may be any such elements capable of operating in accordance with this invention.

It should be clear to one skilled in the art that conductor 12 may be omitted. A variety of alternative means are known for maintaining the source of domains. A permanent magnet, for example, may be used. Also, a doping to lower the coercive force of the material adjacent the boundary of sheet 11 is useful to this end.

What has been described is considered only illustrative of the principles of this invention. Accordingly, numerous variations therein may be devised by one skilled in the art without departing from the spirit and scope of this invention.

What is claimed is:

1. In a domain propagation device the combination comprising a magnetic sheet in which single wall domains can be moved, said sheet including a region of first magnetization occupying a first area, a first conductor encompassing a second area larger than said first area, means for pulsing said first conductor in a manner to grow said region to occupy the entire said second area, said conductor having a geometry defining an indentation into said second area beyond which said region protrudes when grown, a second conductor having a geometry mating with said indentation, and means for pulsing said second conductor in a manner to separate from said region of first magnetization that portion thereof which protrudes beyond said indentation.

2. A combination in accordance with claim 1 also including a third conductor encompassing said first area and means for driving said third conductor in a manner to contract said region of first magnetization into only said first area.

3. A combination in accordance with claim 2 also including means for selectively driving said second conductors for extending said region of first magnetization.

4. A combination in accordance with claim 1 including means contracting said region into said first area.

References Cited

UNITED STATES PATENTS 2,919,432 12/1959 Broadbent ---------- 340—174

BERNARD KONICK, Primary Examiner

K. E. KROSIN, Assistant Examiner